March 7, 1961 T. R. STOCKTON 2,973,847
OVERRUNNING COUPLING
Filed Jan. 2, 1958 2 Sheets-Sheet 2

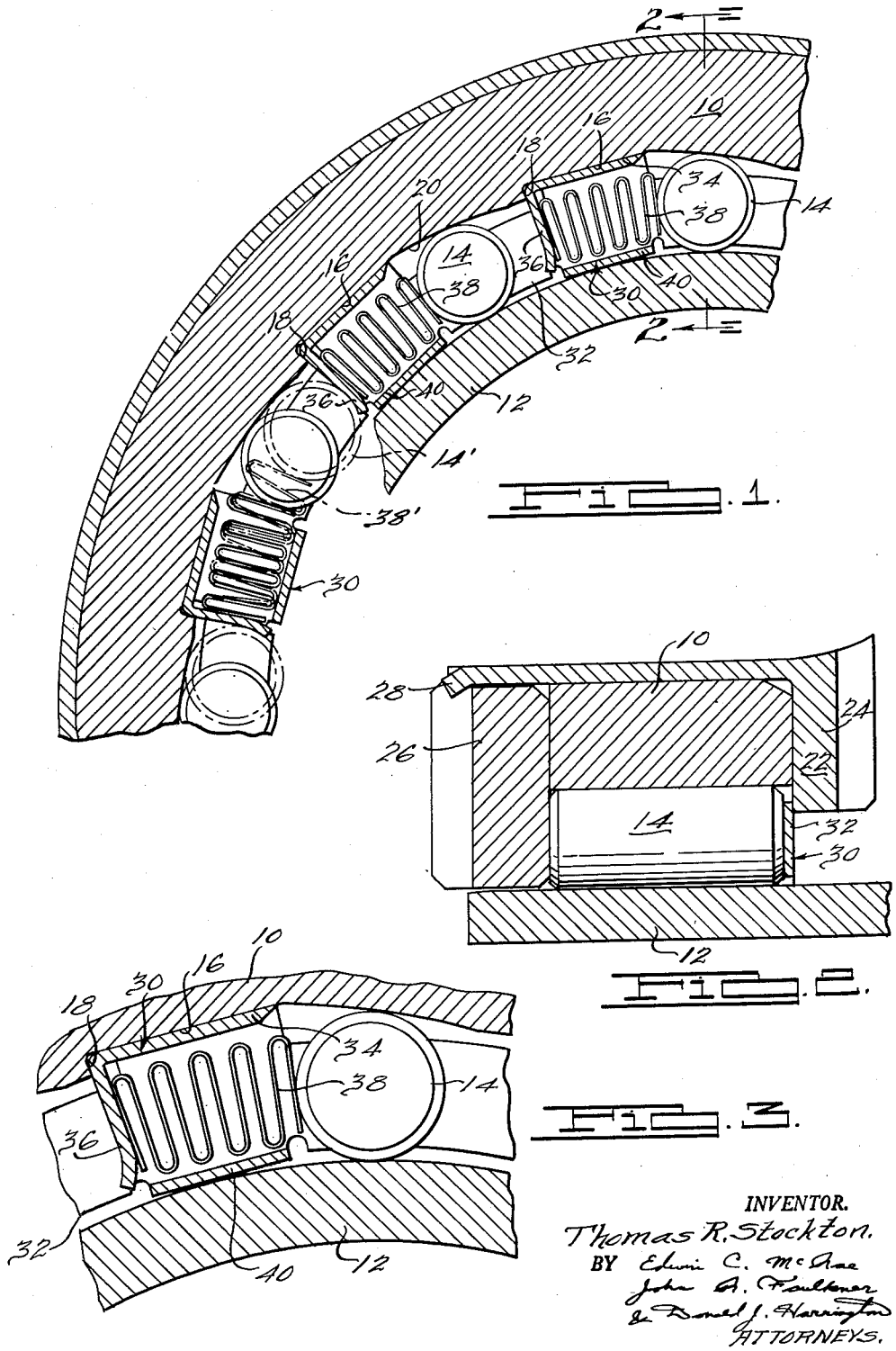

INVENTOR.
Thomas R. Stockton.
BY
ATTORNEYS.

United States Patent Office 2,973,847
Patented Mar. 7, 1961

2,973,847

OVERRUNNING COUPLING

Thomas R. Stockton, Northville, Mich., assignor to Ford Motor Company, Dearborn, Mich., a corporation of Delaware Filed Jan. 2, 1958, Ser. No. 706,736

3 Claims. (Cl. 192—45)

My invention relates generally to a new and improved coupling mechanism for use as an overrunning clutch or brake and more particularly to a coupling mechanism capable of inhibiting relative rotation in one direction between two concentric coupling races while accommodating relative rotation therebetween in the opposite direction.

The improved coupling mechanism of my invention includes concentric inner and outer races between which are situated a plurality of circumferentially spaced rollers, one race being formed with cam surfaces for cooperation with the rollers. The individual rollers are urged into camming engagement with the associated cam surfaces by compression spring elements.

According to a principal feature of my invention, I have provided a one-piece element for positioning the springs for continuous engagement with the associated rollers and for fixing the rollers in place during assembly and disassembly operations.

The provision of an improved roller clutch or brake construction of the type above set forth being a principal object of my invention, it is a further object of my invention to provide a one-way clutch or brake construction with a one-piece retainer element as above set forth wherein the retainer element is further adapted to pilot the inner race with respect to the outer race.

It is a further object of my invention to provide a one-way coupling of the roller type wherein a one-piece retainer element is employed for securing the rollers in position and for maintaining a plurality of springs in individual continuous engagement with the rollers whereby the rollers are urged into camming engagement with cam surfaces formed in the outer race.

It is a further object of my invention to provide a new and improved high capacity one-way coupling construction of the type above set forth wherein a one-piece spring retainer element is anchored against reaction shoulders formed in the outer coupling race and wherein a portion of the retainer ring is formed with a plurality of pilot tabs situated in tangential contact with the inner race whereby the inner race is piloted with respect to the outer race.

It is a further object of my invention to provide a simplified coupling construction as above set forth wherein the retainer element may be formed by means of a simple stamping and bending operation.

It is a further object of my invention to provide a simplified coupling construction wherein a minimum amount of finish machining is required during manufacture and wherein an economical use of material is made possible.

It is a further object of my invention to provide a roller type coupling construction wherein the number of rollers included therein is substantially greater than the number of rollers which may be used with conventional coupling constructions of corresponding size.

For the purpose of more particularly describing the principal features of my invention, reference will be made to the accompanying drawings wherein:

Figure 1 is an assembly view showing a portion of the first embodiment of the improved clutch construction of my instant invention;

Figure 2 is a partial cross sectional view of the assembly of Figure 1 and it is taken along section line 2—2 of Figure 1;

Figure 3 is an enlarged subassembly view showing in more particular detail one portion of the coupling construction of Figure 1;

Figure 4:
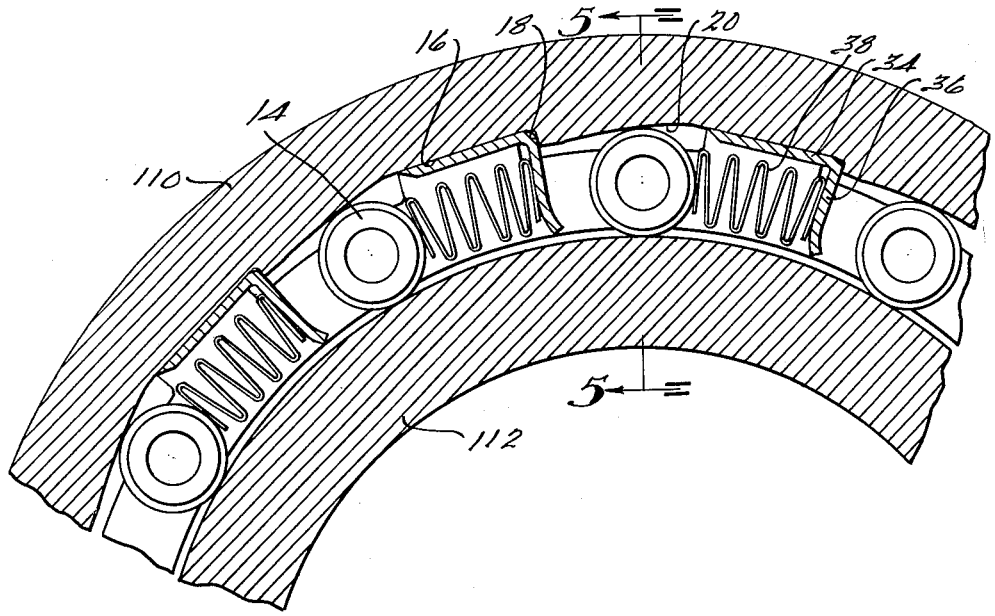
Figure 4 is an assembly view showing a portion of a second embodiment of my invention.

Referring first to Figures 1 and 2, numeral 10 is used to generally designate the outer race of the coupling construction of the first embodiment of my invention and numeral 12 generally designates the inner race thereof, said inner and outer races being concentrically positioned with respect to each other. Each race is annular in shape and the outer surface of the inner race 12 is radially spaced with respect to the inner surface of the outer race 10 thus defining therebetween an annular cavity within which a plurality of rollers are positioned, said rollers being generally designated in Figure 1 by numeral 14. The rollers 14 are cylindrical in shape and by preference are formed with a diameter substantially less than the axial width, the latter dimension being substantially equal to the axial dimension of the inner and outer races 10 and 12.

The inner surface of the outer race 10 has formed thereon a plurality of recesses 16, each recess comprising a flat surface 16 and a transversely disposed surface 18. These recesses are situated in equally spaced increments about the axis of the coupling assembly as illustrated. A plurality of cam surfaces 20 is also formed in the outer race 10, one cam surface 20 being disposed between each adjacent pair of the above described recesses.

A roller is disposed in camming engagement with each cam surface 20 and the radially inward side of each roller tangentially engages the outer surface of the inner race 12 as indicated.

Referring more particularly to Figure 2, the outer race may be received within a member 22 and held in fixed relationship therewith in a conventional manner. The member 22 may form a part of a torque delivery shaft or a part of a torque absorbing member such as the reactor member of a bladed hydrodynamic torque converter unit. The member 22 may include a radially disposed reaction shoulder 24 and a thrust member 26 may be situated on one side of the outer race 10 and held in axially fixed relationship with respect to the member 22 in a conventional fashion; for example, by means of a deformed lip 28. Similarly, the inner race 12 may form a portion of a torque transmitting member such as the reaction sleeve shaft for a hydrodynamic torque converter unit.

I have generally designated by means of numeral 30 a one-piece retainer element which may be formed by means of a stamping operation from a piece of flat sheet metal stock. The retainer element 30 is circular in shape and it includes a circular, flat body portion 32. Spring enclosure portions 34 are integrally formed on the body portion 32 and they are each disposed in a plane situated at a right angle with respect to the plane of the body portion 32. Each of the spring enclosure portions 34 in turn have formed thereon a tab 36 extending in a generally radial direction in a plane situated at a right angle with respect to the body portion 32.

It is thus apparent that the retainer element 30 may readily be formed by means of a simple stamping operation from a single piece of sheet metal stock. The spring enclosure portion 34 may be formed from the stamped part by means of a simple bending operation and the tabs 36 may then be formed by means of a simple secondary bending operation. The radially inward part of the tabs 36 may be formed with a radius conforming to the radius of the rollers 14.

A plurality of flat, convoluted compression springs 38 are disposed within each of the spring enclosure portions defined by the retainer element with one end thereof in contact with an adjacent roller 14, the other end thereof being anchored against an associated tab 36 of the retainer element 30 said tabs 36 forming a reaction shoulder for springs 38. By preference the springs 38 are formed with a relatively large number of convolutions in order to provide a uniform pressure on each of the rollers although I contemplate that other spring configurations may also be employed. The spring enclosure portions 34 of the retainer element 30 are formed with a flat outer surface capable of engaging the adjacent flat surface 16 of the recesses formed in the outer race 10. The shoulders 18 of the recesses in the outer race 10 are adapted to be engaged by the spring enclosure portion 34 thereby providing a tangential reaction force for the springs 38.

The recesses in the outer race 10 may be relatively shallow thereby making it possible to reduce the amount of finish machining required during manufacture.

In the embodiment of Figures 1, 2 and 3, the retainer element 30 further includes a pilot tab 40 which may also be formed during the above described stamping operation and it may be bent by means of a simple bending operation until it is situated in a tangential plane. The pilot tab 40 is adapted to contact tangentially the outer surface of the inner race 12 and it will thus be apparent that the inner race 12 may be piloted with respect to the outer race 10 in this fashion.

When the clutch mechanism is disassembled, the retainer element 30 and the outer race 10 may be removed as a unit. The spring elements 38 will then urge the associated roller elements 14 tangentially until they engage the adjacent tab 36 for the adjacent spring enclosure portion. Since the tabs 36 are formed with radii as above described, the rollers 14 are prevented from escaping and are held in place by the spring pressure of the associated springs 38. This feature provides greatly added convenience during assembly and disassembly operations. For purposes of demonstration, I have illustrated in Figure 1 one roller 14' and one spring 38' as they appear in the disassembled position, the spring 38' being fully extended and the roller 14' contacting the adjacent tab 36 of the adjacent spring enclosure portion.

Figure 5:
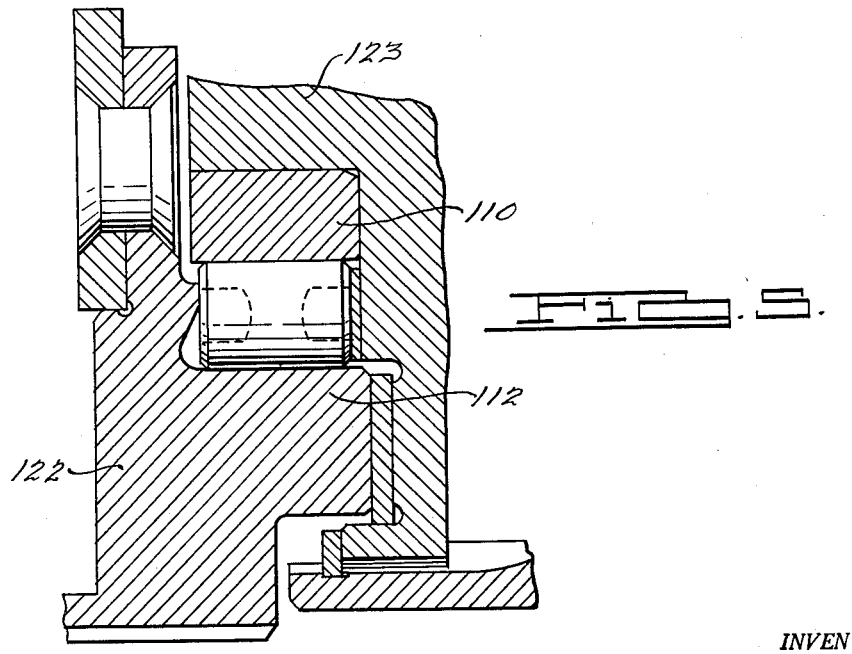
Figure 5 is a partial cross sectional view of a portion of the assembly of Figure 4 and is taken along section line 5—5 of Figure 4.

I contemplate that in certain installations the inner and outer races of the coupling assembly may be piloted at some other location and for this reason it becomes desirable to omit the pilot tab 30. An installation of this type is illustrated in Figures 4 and 5 wherein a first torque delivery shaft 122 is piloted with respect to a second torque delivery shaft 123 and wherein the modified coupling construction of my invention may be used for providing a one-way driving connection therebetween. The shaft 122 is formed with an outer race 110 and the shaft 123 has integrally formed therewith an inner race 112 as illustrated. In this modification the outer race 110 is formed with circumferentially spaced recesses and the spring enclosure portions of the retainer element are situated thereon in a fashion substantially similar to the construction above described in connection with Figures 1, 2 and 3. The coupling construction in the embodiment of Figures 4 and 5 may be similar to the previously described embodiment except that the pilot tab is omitted, the corresponding elements of both constructions being designated in the drawings by identical reference symbols.

Having thus described the principal features of my instant invention, what I claim and desire to secure by U.S. Letters Patent is:

1. An overrunning coupling mechanism comprising an inner race and an outer race situated in concentric relationship, cam surfaces formed in said outer race at circumferentially spaced locations, clutch rollers engageable with said cam surfaces for establishing a one-way connection between said races, a separate spring element engaging each roller and adapted to urge the same into camming engagement with its associated cam surface, recesses formed in said outer race intermediate said cam surfaces, and a one-piece spring retainer element having portions thereof anchored in said recess and disposed between said rollers, said retainer element including an annular body portion disposed in a radial plane adjacent said rollers and a plurality of spring enclosure portions integrally joined to said body portion, a separate one of said enclosure portions being adapted to partly enclose each spring element, and a reaction shoulder forming a part of each enclosure portion comprising a tab disposed in a plane transverse to the plane of said body portion, one tab being disposed between each pair of rollers, said spring being situated between each tab and an adjacent roller, the radially inward ends of said reaction shoulders being deformed tangentially away from their associated springs whereby the next adjacent roller may engage the same when said coupling mechanism is disassembled from said inner race, the deformed portions of said tabs thereby maintaining said rollers in position during assembly and disassembly operations.

2. An overrunning coupling comprising an inner race and an outer race situated in concentric relationship, cam surfaces formed in said outer race at circumferentially spaced locations, clutch rollers engageable with said cam surfaces for establishing a one-way connection between said races, a separate spring element contacting each roller and adapted to urge the same into camming engagement with its associated cam surface, recesses formed in said outer race intermediate said cam surface, and a one-piece spring retainer element having portions thereof anchored in said recesses and disposed between said rollers, said retainer element including a flat disc portion disposed adjacent said rollers in a plane transverse to the axis of said mechanism and a spring enclosure portion formed integrally with said disc portion, separate ones of said enclosure portions being adapted to partly enclose each spring element, and a pilot tab formed integrally with said disc portion and disposed in a plane tangential to said inner race whereby said inner race is piloted with respect to said outer race.

3. An overrunning coupling mechanism comprising an inner race and an outer race situated in concentric relationship, cam surfaces formed in said outer race at circumferentially spaced locations, clutch rollers engageable with said cam surface for establishing a one-way connection between said races, a separate compression spring element contacting each roller and adapted to urge the same into camming engagement with its associated cam surface, recesses formed in said outer race intermediate said cam surfaces, and a one-piece spring retainer element having separate portions thereof anchored in said recesses and disposed between said rollers, said retainer element including an annular body portion disposed in a radial plane adjacent said roller, a plurality of spring enclosure portions integrally joined to said body portion, a separate one of said enclosure portions being adapted to partly enclose each spring element, a reaction shoulder forming a part of each enclosure portion comprising a first tab disposed in a plane transverse to the plane of said body portion, and a second tab integrally formed on said annular body portion in a plane tangential to said inner race whereby said inner race is piloted with respect to said outer race, one of said compression springs being situated between each of said first tabs and an adjacent roller, said first tabs being adapted to be engaged with said rollers when said outer race is disassembled from the mechanism, said springs being adapted to urge the rollers into engagement with said first tabs and to maintain the same in position during assembly and disassembly.

References Cited in the file of this patent

UNITED STATES PATENTS

| | | |
|---|---|---|
| 1,820,151 | Mullen | Aug. 25, 1931 |
| 2,069,558 | Rauen et al. | Feb. 2, 1937 |
| 2,172,653 | Flogaus | Sept. 12, 1939 |
| 2,371,653 | Schuckers | Mar. 20, 1945 |

FOREIGN PATENTS

| | | |
|---|---|---|
| 822,455 | Germany | July 8, 1949 |